(12) United States Patent
Hattori

(10) Patent No.: US 12,384,889 B2
(45) Date of Patent: Aug. 12, 2025

(54) SILICONE RUBBER-SILICONE MODIFIED POLYIMIDE RESIN LAMINATED BODY

(71) Applicant: SHIN-ETSU CHEMICAL CO., LTD., Tokyo (JP)

(72) Inventor: Hatsuhiko Hattori, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1265 days.

(21) Appl. No.: 17/042,256

(22) PCT Filed: Mar. 28, 2019

(86) PCT No.: PCT/JP2019/013506
§ 371 (c)(1),
(2) Date: Sep. 28, 2020

(87) PCT Pub. No.: WO2019/189542
PCT Pub. Date: Oct. 3, 2019

(65) Prior Publication Data
US 2021/0047473 A1    Feb. 18, 2021

(30) Foreign Application Priority Data

Mar. 29, 2018 (JP) .................................. 2018-064901

(51) Int. Cl.
| | | |
|---|---|---|
| *C08G 77/455* | (2006.01) | |
| *B32B 25/08* | (2006.01) | |
| *B32B 27/28* | (2006.01) | |

(52) U.S. Cl.
CPC ............ *C08G 77/455* (2013.01); *B32B 25/08* (2013.01); *B32B 27/281* (2013.01); *B32B 2457/00* (2013.01)

(58) Field of Classification Search
CPC ....... Y10T 428/24942; Y10T 428/2495; Y10T 428/24959; Y10T 428/24967;
(Continued)

(56) References Cited

U.S. PATENT DOCUMENTS

| | | |
|---|---|---|
| 6,068,932 A | 6/2000 | Sakamoto et al. |
| 10,654,980 B2 | 5/2020 | Shimakawa |

(Continued)

FOREIGN PATENT DOCUMENTS

| | | |
|---|---|---|
| JP | 5-125337 A | 5/1993 |
| JP | 10-279799 A | 10/1998 |

(Continued)

OTHER PUBLICATIONS

Machine translation (Espacenet) of JP 2009-073875 A. Translated Dec. 18, 2023. (Year: 2023).*

(Continued)

*Primary Examiner* — Maria V Ewald
*Assistant Examiner* — Ethan A. Utt
(74) *Attorney, Agent, or Firm* — Birch, Stewart, Kolasch & Birch, LLP

(57) ABSTRACT

Since this laminated body having a silicone rubber and, at least in a section of a surface thereof, a layer of a cured product of a silicone-modified-polyimide resin composition that contains, for example, components (A), (Bc), and (C) possesses elasticity and allows wiring by means of a conductive paste thereon, such a laminated body is suitable as a base material of an electronic device. The component (A) is a silicone-modified polyimide resin in formula (1)

$$Ee\text{-}Ff\text{-}Gg \qquad (1)$$

{where E is represented by formula (2); F is represented by formula (3); G is a bivalent group derived from a diamine; $f+e+g=100$ mol %; the molar ratio $f/(e+g)$ is 0.9 to 1.1; and e is 1-90 assuming that the sum of e and g is 100

(Continued)

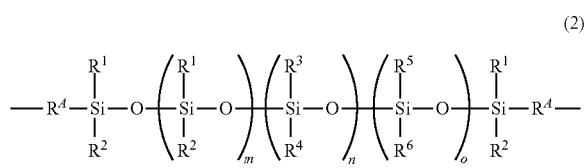

(2)

($R^4$ is a bivalent hydrocarbon group, $R^1$ and $R^2$ are alkyl groups, $R^3$ and $R^4$ are monovalent aliphatic hydrocarbon groups, $R^5$ and $R^6$ are aryl groups or the like, m is an integer of 0-20, n is an integer of 1-20, o is an integer of 0-20, and m+n+o is an integer of 1-30)

-Im-X-Im- (3)

(Im is a cyclic group containing a cyclic imide structure, and X is selected from a single bond, O, and so forth)};
the component (Bc) is a thermally degradable radical initiator; and
the component (C) is a solvent.

4 Claims, 1 Drawing Sheet

(58) Field of Classification Search
CPC ........... Y10T 428/24975; Y10T 428/26; Y10T 428/263; Y10T 428/264; Y10T 428/265; Y10T 428/266; Y10T 428/269; Y10T 428/28; Y10T 428/2848; Y10T 428/2852; Y10T 428/2878; Y10T 428/2896; Y10T 428/31663; Y10T 428/31721; B32B 25/00; B32B 25/04; B32B 25/042; B32B 25/08; B32B 25/14; B32B 25/20; B32B 27/04; B32B 27/06; B32B 27/28; B32B 27/281; B32B 27/283; B32B 2379/00; B32B 2379/08; B32B 2383/00; B32B 2457/00; C08G 73/00; C08G 73/06; C08G 73/10; C08G 77/00; C08G 77/04; C08G 77/22; C08G 77/26; C08G 77/42; C08G 77/452; C08G 77/455; C08G 73/0605; C08G 73/0611; C08G 73/0622; C08G 73/0627; C08G 73/0672; C08G 73/0683; C08G 73/0688; C08G 73/1092; C08L 79/00; C08L 79/04; C08L 79/08; C08L 83/04; C08L 83/10; C08L 83/00
USPC ....... 428/212, 213, 214, 215, 216, 220, 332, 428/334, 335, 336, 337, 339, 340, 341, 428/343, 354, 355 R, 355 EN, 355 N, 428/446, 447, 448, 450, 473.5, 271; 528/10, 25, 26, 28, 43, 310, 322, 27
See application file for complete search history.

(56) References Cited

U.S. PATENT DOCUMENTS

| | | | |
|---|---|---|---|
| 2009/0062479 A1* | 3/2009 | Yoneda | C08G 77/455 525/408 |
| 2009/0062480 A1* | 3/2009 | Yoneda | C08G 73/106 525/417 |
| 2012/0295085 A1 | 11/2012 | Iida et al. | |
| 2017/0355825 A1* | 12/2017 | Hattori | C08G 73/1075 |
| 2018/0312723 A1 | 11/2018 | Hattori et al. | |

FOREIGN PATENT DOCUMENTS

| | | | | |
|---|---|---|---|---|
| JP | 2003-55636 A | | 2/2003 | |
| JP | 2005-347273 A | | 12/2005 | |
| JP | 2009073875 A | * | 4/2009 | ............... B05D 1/62 |
| JP | 2017-222745 A | | 12/2017 | |
| WO | WO 2011/089922 A1 | | 7/2011 | |
| WO | WO-2012091498 A1 | * | 7/2012 | ....... H01L 23/53276 |
| WO | WO 2017/104811 A1 | | 6/2017 | |
| WO | WO 2017/110576 A1 | | 6/2017 | |

OTHER PUBLICATIONS

Machine translation (Espacenet) of WO 2012/091498 A1. Translated Mar. 23, 2024. (Year: 2024).*
International Search Report, issued in PCT/JP2019/013506, dated Jun. 18, 2019.
Written Opinion of the International Searching Authority, issued in PCT/JP2019/013506, dated Jun. 18, 2019.

* cited by examiner

SILICONE RUBBER-SILICONE MODIFIED POLYIMIDE RESIN LAMINATED BODY

TECHNICAL FIELD

This invention relates to a silicone rubber/silicone-modified polyimide resin laminate, and more particularly, to a silicone rubber/silicone-modified polyimide resin laminate comprising a silicone rubber and a silicone-modified polyimide resin layer on the surface thereof.

BACKGROUND ART

The recent advances of wearable devices place a demand for stretchable materials with a comfortable texture.

One of the materials meeting the demand is silicone rubber (see Patent Document 1). The silicone rubber, however, has the problems of low wettability and poor bond or adhesion to various materials because of water repellency inherent to the siloxane chain structure.

Also, there arises the problem that the water vapor permeability which is one of the characteristics of silicone has detrimental effects on electronic devices, typically corrosion and short-circuiting.

PRIOR ART DOCUMENTS

Patent Documents

Patent Document 1: WO 2017/104811

SUMMARY OF INVENTION

Technical Problem

An object of the invention, which has been made under the above-mentioned circumstances, is to provide a silicone rubber/silicone-modified polyimide resin laminate which is stretchable, amenable to wiring with conductive paste, and useful as a substrate for electronic devices.

Solution to Problem

Making extensive investigations to attain the above object, the inventor has found that a silicone-modified polyimide resin layer is disposed on the surface of a silicone rubber to construct a silicone rubber/silicone-modified polyimide resin laminate which is stretchable and fully adhesive to conductive paste. The invention is predicated on this finding.

The invention is defined below.

1. A silicone rubber/silicone-modified polyimide resin laminate comprising a silicone rubber having a surface and a cured product layer of a silicone-modified polyimide resin composition disposed on at least a part of the silicone rubber surface, the cured product layer having a thickness of 0.5 to 20 μm, said silicone-modified polyimide resin composition comprising:

(A1) 100 parts by weight of a radically crosslinking silicone-modified polyimide resin having the following formula (1):

wherein E, F and G are repeating units which are randomly arranged, E is a divalent group derived from a diamino-modified silicone, represented by the formula (2), F is a divalent group derived from a tetracarboxylic dianhydride, represented by the formula (3), and G is a divalent group derived from a diamine, with the proviso that f+e+g=100 mol %, a molar ratio of f/(e+g) is from 0.9/1 to 1.1/1, and e is 1 to 90 when the sum of e+g is 100,

[Chem. 1]

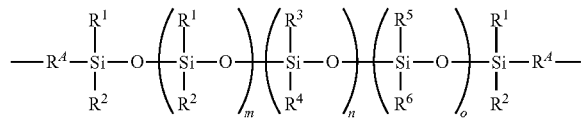

wherein $R^A$ is each independently a $C_1$-$C_{10}$ substituted or unsubstituted divalent hydrocarbon group, $R^1$ and $R^2$ are each independently a $C_1$-$C_{10}$ substituted or unsubstituted alkyl group, $R^3$ and $R^4$ are each independently a $C_1$-$C_{10}$ monovalent aliphatic hydrocarbon group, at least one of $R^3$ and $R^4$ has an aliphatic unsaturated bond, $R^5$ and $R^6$ are each independently a substituted or unsubstituted $C_1$-$C_{10}$ alkyl group, $C_6$-$C_{10}$ aryl group or $C_7$-$C_{16}$ aralkyl group, m is an integer of 0 to 20, n is an integer of 1 to 20, o is an integer of 0 to 20, the sum of m+n+o is 1 to 30, and the arrangement of siloxane units in parentheses with subscripts m, n, and o may be random, alternate or blockwise, $$-Im-X-Im- \quad (3)$$

wherein Im is a cyclic group terminated with a cyclic imide structure, and X is a single bond or a divalent group selected from among —O—, —S—, —S(→O)—, —S(=O)$_2$—, —C(=O)—, —NR$^N$— wherein R$^N$ is a $C_1$-$C_{12}$ monovalent hydrocarbon group, —CR$^B{}_2$— wherein R$^B$ is each independently hydrogen or a $C_1$-$C_{12}$ monovalent hydrocarbon group which may contain halogen, —R$^{Ar}{}_h$— wherein R$^{Ar}$ is a $C_6$-$C_{12}$ divalent arylene group, h is an integer of 1 to 6, and R$^{Ar}$ may be the same or different when h is at least 2, —R$^{Ar}{}_h$—(OR$^{Ar}$)$_i$— wherein R$^{Ar}$ and h are as defined above and i is an integer of 1 to 5, $C_1$-$C_{12}$ straight or branched alkylene groups, $C_5$-$C_{12}$ cycloalkylene groups, and $C_7$-$C_{12}$ arylenealkylene groups, (Bc) 0.1 to 10 parts by weight of a heat decomposable radical initiator, and (C) 100 to 700 parts by weight of a solvent, or (A2) 100 parts by weight of an epoxy curable silicone-modified polyimide resin having the following formula (1'):

wherein E', F' and G' are repeating units which are randomly arranged, E' is a divalent group derived from a diamino-modified silicone, represented by the formula (2'), F' is a divalent group derived from a tetracarboxylic dianhydride, represented by the formula (3), G' is a divalent group derived from a diamine, and at least some of G' contain a divalent group derived from a hydroxyl-containing aromatic diamine, with the proviso that f'+e'+g'=100 mol %, a molar ratio of f'/(e'+g') is from 0.9/1 to 1.1/1, and e' is 1 to 90 when the sum of e'+g' is 100,

[Chem. 2]

$$—R^A-\underset{\underset{R^2}{|}}{\overset{\overset{R^1}{|}}{Si}}-O\left(\underset{\underset{R^2}{|}}{\overset{\overset{R^1}{|}}{Si}}-O\right)_p\left(\underset{\underset{R^8}{|}}{\overset{\overset{R^7}{|}}{Si}}-O\right)_q\underset{\underset{R^2}{|}}{\overset{\overset{R^1}{|}}{Si}}-R^A—$$ (2')

wherein $R^A$ is each independently a $C_1$-$C_{10}$ substituted or unsubstituted divalent hydrocarbon group, $R^1$ and $R^2$ are each independently a $C_1$-$C_{10}$ substituted or unsubstituted alkyl group, $R^7$ and $R^8$ are each independently a substituted or unsubstituted $C_6$-$C_{10}$ aryl group or $C_7$-$C_{16}$ aralkyl group, p is an integer of 1 to 20, q is an integer of 0 to 20, the sum of p+q is 1 to 30, and the arrangement of siloxane units in parentheses with subscripts p and q may be random, alternate or blockwise, -Im-X-Im- (3)

wherein Im is a cyclic group terminated with a cyclic imide structure, and X is a single bond or a divalent group selected from among —O—, —S—, —S(→O)—, —S(=O)$_2$—, —C(=O)—, —NR$^N$— wherein R$^N$ is a $C_1$-$C_{12}$ monovalent hydrocarbon group, —CR$^B{}_2$— wherein R$^B$ is each independently hydrogen or a $C_1$-$C_{12}$ monovalent hydrocarbon group which may contain halogen, —R$^{Ar}{}_h$— wherein R is a $C_6$-$C_{12}$ divalent arylene group, h is an integer of 1 to 6, and R$^{Ar}$ may be the same or different when h is at least 2, —R$^{Ar}{}_h$—(OR$^{Ar}$)$_i$— wherein R$^{Ar}$ and h are as defined above and i is an integer of 1 to 5, $C_1$-$C_{12}$ straight or branched alkylene groups, $C_5$-$C_{12}$ cycloalkylene groups, and $C_7$-$C_{12}$ arylene-alkylene groups, (Be) 0.1 to 10 parts by weight of an epoxy resin crosslinker, and (C) 250 to 1,200 parts by weight of a solvent.

2. The silicone rubber/silicone-modified polyimide resin laminate of 1 wherein Im is selected from the following groups:

[Chem. 3]

wherein the line with an intersecting wavy line designates a valence bond and the valence bond of the nitrogen atom attaches to E or G in formula (2) or to E' or G' in formula (2') and the other valence bond attaches to X.

3. The silicone rubber/silicone-modified polyimide resin laminate of 1 or 2 wherein said silicone-modified polyimide resin composition further comprises (D) 0.01 to 1 part by weight of an antioxidant per 100 parts by weight of component (A1) or (A2).

4. The silicone rubber/silicone-modified polyimide resin laminate of any one of 1 to 3 wherein said silicone-modified polyimide resin composition has a viscosity at 25° C. of 1 to 300 mPa·s.

5. A stretchable electronic device comprising the silicone rubber/silicone-modified polyimide resin laminate of any one of 1 to 4.

Advantageous Effects of Invention

Since the silicone rubber/silicone-modified polyimide resin laminate of the invention is constructed by disposing a cured product layer of a silicone-modified polyimide resin composition on the surface of a silicone rubber for surface modification, it develops excellent adhesion to conductive paste without interfering with the stretchability of silicone rubber. The laminate is thus useful as a substrate for stretchable electronic devices such as wearable devices.

DESCRIPTION OF EMBODIMENTS

Figure 1:
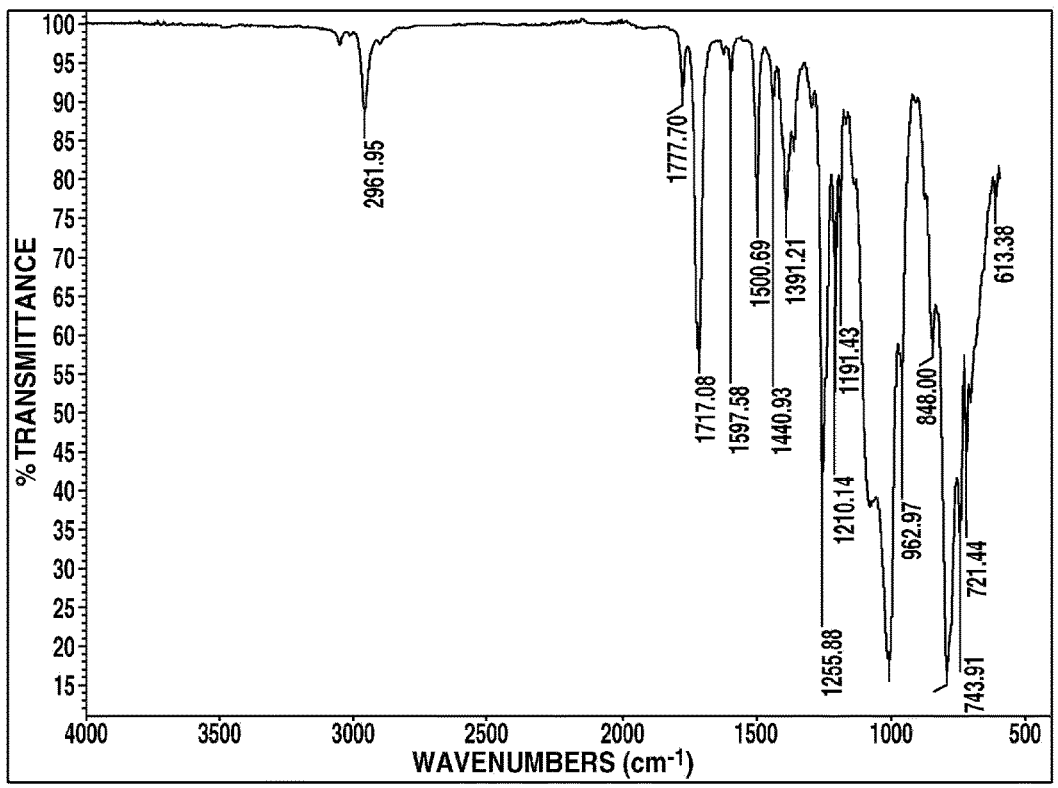
FIG. 1 is a diagram of the infrared absorption spectrum of the silicone-modified polyimide resin obtained in Synthesis Example 1.

Now the invention is described in detail.

The invention provides a silicone rubber/silicone-modified polyimide resin laminate comprising a silicone rubber having a surface and a cured product layer of a silicone-modified polyimide resin composition disposed on at least a part of the silicone rubber surface.

[1] Silicone-Modified Polyimide Resin Composition

The silicone-modified polyimide resin composition used herein to form a cured product layer should preferably comprise the following components (A) to (C):

(A) a silicone-modified polyimide resin,
(B) a crosslinker or curing agent, and
(C) a solvent because such composition has good adhesion to silicone rubber.

(1) Component (A)

The silicone-modified polyimide resin or component (A) serves as the main component or base polymer in the composition and is divided into (A1) a radically crosslinking silicone-modified polyimide resin and (A2) an epoxy crosslinking silicone-modified polyimide resin.

The radically crosslinking silicone-modified polyimide resin (A1) used herein is preferably a resin having the following formula (1).

Ee-Ff-Gg (1)

In formula (1), E, F and G are repeating units which are randomly arranged (exclusive of combinations of adjoining units represented by E-E, F-F, G-G, and E-G), E is a divalent group derived from a diamino-modified silicone, represented by the following formula (2), F is a divalent group derived from a tetracarboxylic dianhydride, represented by the following formula (3), and G is a divalent group derived from a diamine, with the proviso that f+e+g=100 mol %, a molar ratio of f/(e+g) is from 0.9/1 to 1.1/1, and e is 1 to 90 when the sum of e+g is 100.

[Chem. 4]

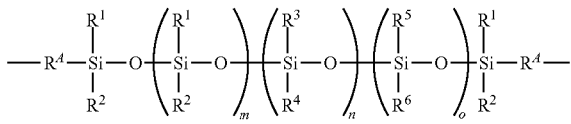

(2)

In formula (2), $R^4$ is each independently a $C_1$-$C_{10}$ substituted or unsubstituted divalent hydrocarbon group, $R^1$ and $R^2$ are each independently a $C_1$-$C_{10}$ substituted or unsubstituted alkyl group, $R^3$ and $R^4$ are each independently a $C_1$-$C_{10}$ monovalent aliphatic hydrocarbon group, at least one of $R^3$ and $R^4$ has an aliphatic unsaturated bond, $R^5$ and $R^6$ are each independently a substituted or unsubstituted $C_1$-$C_{10}$ alkyl group, $C_6$-$C_{10}$ aryl group or $C_7$-$C_{16}$ aralkyl group, m is an integer of 0 to 20, n is an integer of 1 to 20, o is an integer of 0 to 20, and the sum of m+n+o is 1 to 30. The arrangement of siloxane units in parentheses with subscripts m, n, and o may be random, alternate or blockwise.

(3)

In formula (3), Im is a cyclic group terminated with a cyclic imide structure. X is a single bond or a divalent group selected from among —O—, —S—, —S(→O)—, —S(=O)$_2$—, —C(=O)—, —NR$^N$— wherein R$^N$ is a $C_1$-$C_{12}$ monovalent hydrocarbon group, —CR$^B{}_2$— wherein R$^B$ is each independently hydrogen or a $C_1$-$C_{12}$ monovalent hydrocarbon group which may contain halogen, —R$^{Ar}{}_h$— wherein R$^{Ar}$ is a $C_6$-$C_{12}$ divalent arylene group, h is an integer of 1 to 6, and R$^{Ar}$ may be the same or different when h is at least 2, —R$^{Ar}{}_h$—(OR$^{Ar}$)$_i$— wherein R$^{Ar}$ and h are as defined above and i is an integer of 1 to 5, $C_1$-$C_{12}$ straight or branched alkylene groups, $C_5$-$C_{12}$ cycloalkylene groups, and $C_7$-$C_{12}$ arylenealkylene groups.

In formula (2), the $C_1$-$C_{10}$, preferably $C_3$-$C_8$ divalent hydrocarbon group $R^4$ may be straight, branched or cyclic and contain a heteroatom such as oxygen or nitrogen. Examples include alkylene, arylene, aralkylene, and arylenealkylene groups, with the alkylene groups being preferred.

Preferred examples include methylene, ethylene, trimethylene, 1,3-butylene, tetramethylene, 1,3-pentylene, 1,4-pentylene, pentamethylene, hexamethylene, heptamethylene, octamethylene, nonamethylene, decamethylene, 2-(3-prop-1-oxy)eth-1-ylene, 3-(3-prop-1-oxy)prop-1-ylene, 4-(3-prop-1-oxy)but-1-ylene, 5-(3-prop-1-oxy)pent-1-ylene, 6-(3-prop-1-oxy)hex-1-ylene, 1,3-cyclohexylene, 1,4-cyclohexylene, 1,3-cycloheptylene, 1,4-cycloheptylene, N,N-piperidinylene, and 1,4-dioxacyclohex-2,5-ylene. For availability, trimethylene is more preferred.

The $C_1$-$C_{10}$ alkyl groups $R^1$ and $R^2$ may be straight, branched or cyclic, and examples thereof include methyl, ethyl, n-propyl, isopropyl, n-butyl, isobutyl, tert-butyl, n-pentyl, neopentyl, n-hexyl, cyclohexyl, n-heptyl, n-octyl, n-nonyl, n-decyl, and decalyl. Of these, $C_1$-$C_4$ alkyl groups are preferred, with methyl, ethyl, and n-propyl being more preferred. It is even more preferred that both $R^1$ and $R^2$ be methyl or ethyl.

In the alkyl groups, some or all of the hydrogen atoms may be substituted by halogen atoms such as fluorine, chlorine, bromine, and iodine.

The $C_1$-$C_{10}$ monovalent aliphatic hydrocarbon groups $R^3$ and $R^4$ may be straight, branched or cyclic, and examples thereof include $C_1$-$C_{10}$ alkyl groups such as methyl, ethyl, n-propyl, isopropyl, n-butyl, isobutyl, tert-butyl, n-pentyl, neopentyl, n-hexyl, cyclohexyl, n-heptyl, n-octyl, n-nonyl, n-decyl, and decalyl; and $C_2$-$C_{10}$ alkenyl groups such as vinyl, 1-propenyl, allyl (or 2-propenyl), isopropenyl, hexenyl, octenyl, cyclopentenyl, and cyclohexenyl. Of these, $R^3$ and $R^4$ are preferably selected from $C_1$-$C_6$ monovalent aliphatic hydrocarbon groups, more preferably $C_1$-$C_6$ alkyl groups and $C_2$-$C_6$ alkenyl groups, with methyl, ethyl, n-propyl, and vinyl being even more preferred.

It is especially preferred that $R^3$ and/or $R^4$ be a $C_2$-$C_6$ alkenyl group. Therefore, suitable combinations of $R^3$ with $R^4$ are methyl with vinyl, ethyl with vinyl, propyl with vinyl, and vinyl with vinyl.

The $C_1$-$C_{10}$ alkyl groups $R^5$ and $R^6$ are as exemplified above for $R^1$. Likewise, $R^5$ and $R^6$ are preferably selected from $C_1$-$C_4$ alkyl groups, more preferably methyl, ethyl, and n-propyl, with methyl and ethyl being even more preferred.

In the $C_6$-$C_{10}$ aryl groups, some or all of the hydrogen atoms may be substituted by $C_1$-$C_{10}$ alkyl groups as mentioned above, and the aromatic ring may contain a heteroatom.

Examples include phenyl, 2-methylphenyl, 3-methylphenyl, 4-methylphenyl, 2,3-dimethylphenyl, 2,4-dimethylphenyl, 2,6-dimethylphenyl, 3,4-dimethylphenyl, 3,5-dimethylphenyl, 2,3,4-trimethylphenyl, 2,3,5-trimethylphenyl, 2,4,6-trimethylphenyl, and indenyl.

Also, in the $C_7$-$C_{16}$ aralkyl groups, some or all of the hydrogen atoms may be substituted by $C_1$-$C_{10}$ alkyl groups as mentioned above, and the aromatic ring may contain a heteroatom.

Examples include phenylmethyl, 2-phenyl-1-ethyl, 3-phenyl-1-propyl, phenylbutyl, 3-phenyl-1-pentyl, 4-phenyl-1-pentyl, 5-phenyl-1-pentyl, 6-phenyl-1-hexyl, 7-phenyl-1-heptyl, 8-phenyl-1-octylene, 9-phenyl-1-nonyl, 10-phenyl-1-decyl, and 2,3-dihydro-1H-indenyl.

Of these, $R^3$ and $R^4$ are preferably methyl, phenyl, 2-phenyl-1-ethyl, 2-phenyl-2-methyl-1-ethyl, and 3-phenyl-2-propyl.

Especially, suitable combinations of $R^3$ with $R^4$ are methyl with phenyl, methyl with 2-phenyl-1-ethyl, methyl with 2-phenyl-2-methyl-1-ethyl, and phenyl with phenyl.

In formula (2), m is an integer of 0 to 20, n is an integer of 1 to 20, o is an integer of 0 to 20, and the sum of m+n+o is 1 to 60. Preferably m is an integer of 4 to 15, n is preferably an integer of 4 to 10, o is preferably an integer of 0 to 5, n+o is preferably 1 to 40, more preferably 1 to 10, and m+n+o is preferably 5 to 40.

Examples of the group having formula (2) are given below, but not limited thereto.

[Chem. 5]

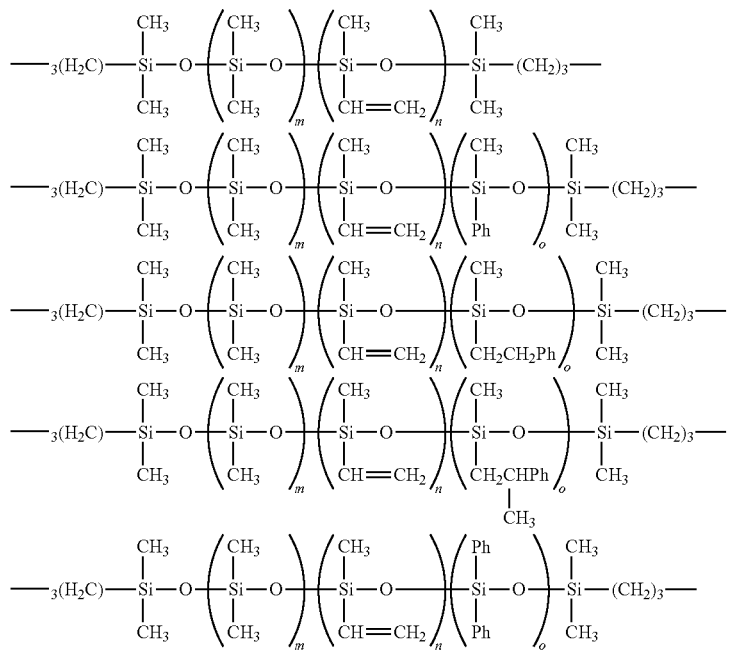

Herein Ph is phenyl, m, n, and o are as defined above. The arrangement of siloxane units in parentheses may be random, alternate or blockwise.

In formula (3), Im having a cyclic imide structure derived from a tetracarboxylic dianhydride is a group terminated with a cyclic imide structure, which is selected from, for example, groups of the following formulae.

[Chem. 6]

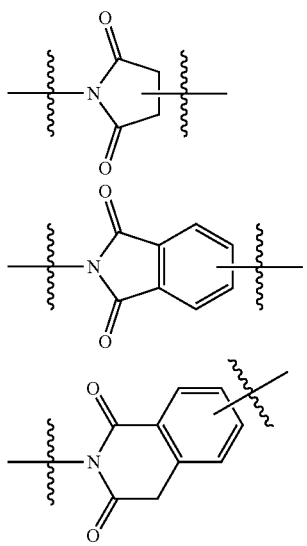

Herein the line with an intersecting wavy line represents a valence bond (the same holds true, hereinafter). The valence bond from a ring-member carbon atom different from the valence bond from the nitrogen atom is to attach to X.

In formula (3), when X is $-NR^N-$, the $C_1$-$C_{12}$, preferably $C_1$-$C_8$ monovalent hydrocarbon group $R^N$ may be straight, branched or cyclic, and examples thereof include $C_1$-$C_{12}$ alkyl groups such as methyl, ethyl, n-propyl, isopropyl, n-butyl, isobutyl, tert-butyl, n-pentyl, neopentyl, n-hexyl, cyclohexyl, n-heptyl, n-octyl, n-nonyl, n-decyl, and decalyl; $C_2$-$C_{12}$ alkenyl groups such as vinyl, 1-propenyl, allyl (or 2-propenyl), hexenyl, octenyl, cyclopentenyl, and cyclohexenyl; $C_6$-$C_{12}$ aryl groups such as phenyl and naphthyl; $C_7$-$C_{12}$ alkylaryl groups such as tolyl, xylyl, ethylphenyl, propylphenyl, butylphenyl, pentylphenyl, and hexylphenyl; and $C_7$-$C_{12}$ aralkyl groups such as benzyl and phenethyl. Especially preferred are $C_1$-$C_8$ straight alkyl groups such as methyl, ethyl, n-propyl, n-butyl, n-pentyl, n-hexyl, n-heptyl, and n-octyl, and substituted forms of these groups in which some or all of the hydrogen atoms are substituted by fluorine, such as trifluoromethyl and 3,3,3-trifluoropropyl. More preferred are methyl and trifluoromethyl.

When X is $-CR^B_2-$, the $C_1$-$C_{12}$ monovalent hydrocarbon group $R^B$ which may contain halogen may be any of monovalent hydrocarbon groups as exemplified above for $R^N$. Suitable halogen atoms include fluorine, chlorine, bromine, and iodine. Inter alia, preference is given to optionally fluorine-substituted alkyl groups such as methyl, ethyl, n-propyl, trifluoromethyl, 3,3,3-trifluoropropyl, and cyclohexyl; optionally fluorine-substituted aryl groups such as phenyl, naphthyl, and perfluorophenyl; and optionally fluorine-substituted aralkyl groups such as phenylethyl and pentafluorophenylethyl.

More preferably, $R^B$ is hydrogen, methyl, trifluoromethyl or phenyl.

When X is —R$^{Ar}_h$—, examples of the $C_6$-$C_{12}$ divalent arylene group R$^{Ar}$ include phenylene, biphenylene, and naphthylene. In the arylene group R$^{Ar}$, some hydrogen atoms may be substituted by hydroxyl, sulfide, 2,3-oxo-1-propyl, methoxy, ethoxy, t-butoxy, methyl, ethyl, propyl, t-butyl, N,N-dimethylamino, cyano, methoxycarbonyl, ethoxycarbonyl, formyl, methylcarbonyl, ethylcarbonyl groups or fluorine atoms.

The subscript h is an integer of 1 to 6.

Preferred examples of R$^{Ar}$ include the following groups.

[Chem. 7]

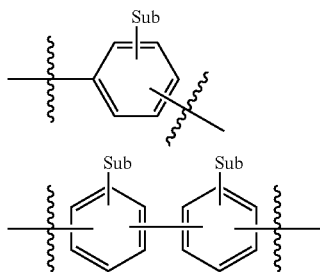

Herein "sub" is hydrogen or a substituent selected from hydroxyl, sulfide, 2,3-oxo-1-propyl, methoxy, ethoxy, t-butoxy, methyl, ethyl, propyl, t-butyl, N,N-dimethylamino, cyano, methoxycarbonyl, ethoxycarbonyl, formyl, methylcarbonyl, ethylcarbonyl, and fluorine. The number of substituents ranges from 1 to 4.

When X is —R$^{Ar}_h$—(OR$^{Ar}$)$_i$—, R$^{Ar}$ and h are as defined above and i is an integer of 1 to 5.

Examples of —R$^{Ar}_h$—(OR$^{Ar}$)$_i$— include groups of the following formulae. In the formulae, —O— may be bonded at any position and the number of bonds ranges from 1 to 4.

[Chem. 8]

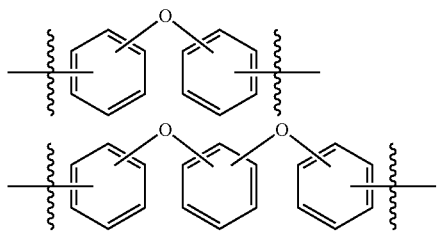

When X is a $C_1$-$C_{12}$ straight or branched alkylene group or $C_5$-$C_{12}$ cycloalkylene group, examples of these groups include methylene, ethylene, trimethylene, 1,3-butylene, tetramethylene, 1,3-pentylene, 1,4-pentylene, pentamethylene, hexamethylene, heptamethylene, octamethylene, nonamethylene, decamethylene, 1,3-cyclohexylene, 1,4-cyclohexylene, 1,3-cycloheptylene, and 1,4-cycloheptylene.

Exemplary of the $C_7$-$C_{12}$ arylenealkylene group represented by X is 2-(4-(2-eth-1-ylene)-1-phenylene)eth-1-ylene.

In formula (1), G is a divalent group derived from a diamine, which is preferably a divalent group derived from a diamine having more heat resistance, but not particularly limited.

Examples of the diamine from which such a divalent group is derived include aliphatic diamines such as tetramethylenediamine, 1,4-diaminocyclohexane, and 4,4'-diaminodicyclohexylmethane, and aromatic diamines such as o-phenylenediamine, m-phenylenediamine, p-phenylenediamine, 4,4'-diaminodiphenyl ether, 2,2-bis(4-aminophenyl) propane, and 2,2-bis[4-(4-aminophenoxy)phenyl]propane, which may be used alone or in a combination of two or more.

The silicone-modified polyimide resin having formula (1) is preferably end-capped with an acid anhydride.

The molar sum of f+e+g is 100 mol % and a molar ratio of f/(e+g) is from 0.9/1 to 1.1/1. For maintaining an adequate molecular weight, the molar ratio of f/(e+g) is preferably from 0.95 to 1.05, more preferably from 0.98 to 1.02.

Provided that the sum of e and g is 100, e is 1 to 90, preferably 20 to 50 in consideration of moisture proofness.

Now referring to the epoxy curable silicone-modified polyimide resin (A2), a resin having the following formula (1') is preferably used.

$$E'e'\text{-}F'f'\text{-}G'g' \tag{1'}$$

In formula (1'), E', F' and G' are repeating units which are randomly arranged, E' is a divalent group derived from a diamino-modified silicone, represented by the following formula (2'), F' is a divalent group derived from a tetracarboxylic dianhydride, represented by the following formula (3), G' is a divalent group derived from a diamine, and at least some of G' contain a divalent group derived from a hydroxyl-containing aromatic diamine, with the proviso that f'+e'+g'=100 mol %, a molar ratio of f'/(e'+g') is from 0.9/1 to 1.1/1, and e' is 1 to 90 when the sum of e'+g' is 100.

[Chem. 9]

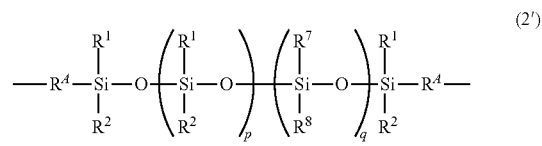

In formula (2'), R$^4$, R$^1$, and R$^2$ are as defined above for formula (2), illustrative examples and preferred examples of which are as exemplified above for formula (2). R$^7$ and R$^8$ are each independently a substituted or unsubstituted $C_6$-$C_{10}$ aryl group or $C_7$-$C_{16}$ aralkyl group, p is an integer of 1 to 20, q is an integer of 0 to 20, the sum of p+q is 1 to 30. The arrangement of siloxane units in parentheses with subscripts p and q may be random, alternate or blockwise.

$$\text{-Im-X-Im-} \tag{3}$$

In formula (3), Im and X are as defined above, illustrative examples and preferred examples of which are as exemplified above.

Examples of the $C_6$-$C_{10}$ aryl group and $C_7$-$C_{16}$ aralkyl group represented by R$^7$ and R$^8$ include groups as exemplified above for R$^5$ and R$^6$. Phenyl, 2-phenyl-1-ethyl, and 3-phenyl-2-propyl are preferred. R$^7$ and R$^8$ are desirably identical groups.

Examples of the group having formula (2') are given below, but not limited thereto.

[Chem. 10]

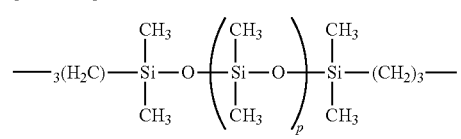

-continued

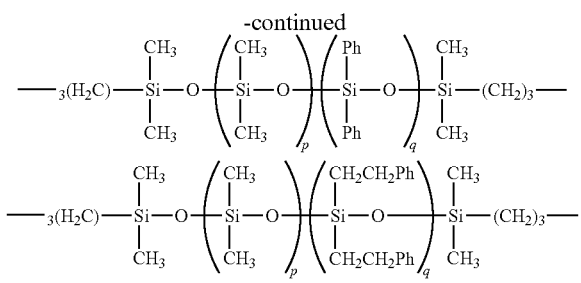

Herein Ph is phenyl, p and q are as defined above. The arrangement of siloxane units in parentheses may be random, alternate or blockwise.

In formula (1'), G' is a divalent group derived from a diamine, which is preferably a divalent group derived from a diamine having more heat resistance, but not particularly limited.

At least some of the divalent groups derived from a diamine, represented by G' in formula (1'), include a residue derived from a hydroxyl-containing aromatic diamine.

Examples of the hydroxyl-containing aromatic diamine include 2,2-bis(3-amino-4-hydroxyphenyl)hexafluoropropane, 2,2-bis(3-amino-4-hydroxyphenyl)propane, 3,3-dihydroxybenzidine, and bis(3-amino-4-hydroxyphenyl)sulfone, which may be used alone or in a combination of two or more.

Also, hydroxyl-free diamines may be used in combination, examples of which are as exemplified above for G.

Although the weight average molecular weight (Mw) of the silicone-modified polyimide resin (A1) or (A2) is not particularly limited, the Mw is preferably 10,000 to 100,000, more preferably 15,000 to 70,000 from the aspects of increasing the strength of the film obtained from a composition comprising the resin and enhancing the compatibility with other components such as a heat decomposable radical initiator and the solubility in solvents.

As used herein, the Mw is measured by gel permeation chromatography (sometimes abbreviated as GPC) versus polystyrene standards (the same holds true, hereinafter).

The silicone-modified polyimide resins (A1) and (A2) may be prepared by any well-known methods.

For example, a polyamic acid which is a precursor of the polyimide resin is first prepared by adding a tetracarboxylic dianhydride, a diamine, and a diamino-modified silicone which is a compound of the formula (2) or (2') having an amino group bonded at each end to a solvent and reacting them at low temperature, i.e., about 20° C. to about 50° C. The polyamic acid solution is then heated at a temperature of preferably 80 to 200° C., more preferably 140 to 180° C. for dehydration ring-closing reaction of the acid amide of polyamic acid, yielding a silicone-modified polyimide resin solution. The solution is then admitted into a solvent such as water, methanol, ethanol or acetonitrile for precipitation. The precipitate is dried, obtaining the silicone-modified polyimide resin.

The ratio f/(e+g) is a ratio (molar ratio) of the total moles of diamine and diamino-modified silicone to moles of tetracarboxylic dianhydride, as computed from the amounts of the reactants. In the reaction, [tetracarboxylic dianhydride (mole)]/[diamine+diamino-modified silicone (mole)] is typically controlled in a range of from 0.9/1 to 1.1/1, preferably from 0.95/1 to 1.05/1, and more preferably from 0.98/1 to 1.02/1.

Examples of the solvent used for preparation of the silicone-modified polyimide resins (A1) and (A2) include N-methyl-2-pyrrolidone, cyclohexanone, γ-butyrolactone, and N,N-dimethylacetamide. Along with this solvent, an aromatic hydrocarbon solvent such as toluene or xylene may be used to facilitate azeotropic removal of the water formed during imidization. The solvents may be used alone or in a combination of two or more.

Notably, a monofunctional reactant may be added for the purpose of adjusting the molecular weight of the silicone-modified polyimide resin, the monofunctional reactant being selected from acid anhydrides such as phthalic anhydride, maleic anhydride, hexahydro-1,3-isobenzofurandione, succinic anhydride, glutaric anhydride, and acid anhydride-modified silicones of 10 to 60 silicon atoms, and amine compounds, for example, aniline, benzylamine, straight, branched, or cyclic alkylamines of 3 to 6 carbon atoms such as propylamine, butylamine, pentylamine, hexylamine and cyclohexylamine.

Also, an aldehyde compound, typically $C_2$-$C_6$ alkyl-containing aldehyde compound such as benzaldehyde, phenylacetaldehyde, propionaldehyde or butyraldehyde may be added.

When added, the compound is preferably used in an amount of 1 to 10 mol % based on the acid anhydride in the charge, in accordance with the desired molecular weight.

The imidization step may also be performed by adding a dehydrating agent and an imidizing catalyst and optionally heating at about 50° C.

Examples of the dehydrating agent include acid anhydrides such as acetic anhydride, propionic anhydride, pivalic anhydride, trifluoroacetic anhydride, and benzoic anhydride. The dehydrating agent is preferably used in an amount of 1 to 10 moles per mole of the diamine.

Examples of the imidizing catalyst include tertiary amines such as triethylamine ($Et_3N$), diisopropylethylamine (DIPEA), tri-n-butylamine, tri-n-pentylamine, tri-n-hexylamine, tri-n-heptylamine, tri-n-octylamine, N-methylpyrrolidine, N-methylpiperazine, N-methylmorpholine, N,N,N',N'-tetramethylethylenediamine (TMEDA), N-methylimidazole (NMI), pyridine, 2,6-lutidine, 1,3,5-collidine, N,N-dimethylaminopyridine, pyrazine, quinoline, 1,8-diazabicyclo[5.4.0]-7-undecene (DBU), and 1,4-diazabicyclo[2.2.2]octane (DABCO). The imidizing catalyst is preferably used in an amount of 0.5 to 10 moles per mole of the dehydrating agent used.

This imidizing procedure is advantageous in that the resulting resin is unlikely to discolor because the reaction solution is not exposed to high temperature during the process.

Even when at least one of the diamine and the tetracarboxylic dianhydride is used as a mixture of two or more species, the reaction process is not particularly limited. For example, the reaction process may involve the steps of premixing all reactants and effecting copolycondensation or the step of adding two or more diamines or tetracarboxylic dianhydrides one by one after individual reaction.

(2) Component (B)

The inventive composition uses a heat decomposable radical initiator (Bc) as component (B) for the radically crosslinking silicone-modified polyimide resin (A1), and an epoxy resin crosslinker (Be) as component (B) for the epoxy crosslinking silicone-modified polyimide resin (A2).

The heat decomposable radical initiator (Bc) is not particularly limited as long as it is thermally decomposed to generate radicals to promote polymerization of the resin into a cured product. Any azo compounds and organic peroxides may be used as the initiator.

Suitable azo compounds or organic azo compounds include azonitrile compounds such as V-30, V-40, V-59, V-60, V-65, V-70, V-501, and V-601; azoamide compounds such as VA-080, VA-085, VA-086, VF-096, VAm-110, and VAm-111; cyclic azoamidine compounds such as VA-044 and VA-061; and azoamidine compounds such as V-50 and VA-057, all available from Wako Pure Chemical Industries, Ltd.; 2,2-azobis(4-methoxy-2,4-dimethylvaleronitrile), 2,2-azobis(2,4-dimethylvaleronitrile), 2,2-azobis(2-methylpropionitrile), 2,2-azobis(2,4-dimethylbutyronitrile), 1,1-azobis(cyclohexane-1-carbonitrile), 1-[(1-cyano-1-methylethyl)azo]formamide, 2,2-azobis{2-methyl-N-[1,1-bis(hydroxymethyl)-2-hydroxyethyl]propionamide}, 2,2-azobis[2-methyl-N-(2-hydroxybutyl)propionamide], 2,2-azobis[N-(2-propenyl)-2-methylpropionamide], 2,2-azobis(N-butyl-2-methylpropionamide), 2,2-azobis(N-cyclohexyl-2-methylpropionamide), 2,2-azobis[2-(2-imidazolin-2-yl)propane] dihydrochloride, 2,2-azobis[2-(2-imidazolin-2-yl)propane] disulfate dihydrate, 2,2-azobis{2-[1-(2-hydroxyethyl)-2-imidazolin-2-yl]propane} dihydrochloride, 2,2-azobis[2-(2-imidazolin-2-yl)propane], 2,2-azobis(1-imino-1-pyrrolidino-2-methylpropane) dihydrochloride, 2,2-azobis(2-methylpropionamidine) dihydrochloride, 2,2-azobis[N-(2-carboxyethyl)-2-methylpropionamidine] tetrahydrate, dimethyl 2,2-azobis(2-methylpropionate), 4,4-azobis(4-cyanovaleric acid), and 2,2-azobis(2,4,4-trimethylpentane). Of these, V-30, V-40, V-59, V-60, V-65, V-70, VA-080, VA-085, VA-086, VF-096, VAm-110, and VAm-111 are preferred, with V-30, V-40, V-59, V-60, V-65, and V-70 being more preferred.

Suitable organic peroxides include ketone peroxides such as PERHEXA H; peroxyketals such as PERHEXA TMH; hydroperoxides such as PERBUTYL H-69; dialkyl peroxides such as PERCUMYL D, PERBUTYL C, PERBUTYL D, and PERBUTYL L; diacyl peroxides such as NIPER BW; peroxyesters such as PERBUTYL Z and PERBUTYL L; and peroxy dicarbonates such as PEROYL TCP, all available from NOF Corp.; diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-di(2-ethylhexanoylperoxy)hexane, t-hexyl peroxy-2-ethylhexanoate, di(4-methylbenzoyl) peroxide, t-butyl peroxy-2-ethylhexanoate, di(3-methylbenzoyl) peroxide, benzoyl(3-methylbenzoyl) peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di[4,4-di-(t-butylperoxy)cyclohexyl]propane, t-hexyl peroxy isopropyl monocarbonate, t-butyl peroxymaleate, t-butyl peroxy-3,5,5-trimethylhexanoate, t-butyl peroxylaurate, t-butylperoxy isopropyl monocarbonate, t-butylperoxy 2-ethylhexyl monocarbonate, t-hexyl peroxybenzoate, 2,5-dimethyl-2,5-di(benzoylperoxy)hexane, t-butyl peroxyacetate, 2,2-di(t-butylperoxy)butane, t-butyl peroxybenzoate, n-butyl 4,4-di-t-butylperoxyvalerate, di(2-t-butylperoxyisopropyl)benzene, dicumyl peroxide, di-t-hexyl peroxide, 2,5-dimethyl-2,5-di(t-butylperoxy)hexane, t-butylcumyl peroxide, di-t-butyl peroxide, p-methane hydroperoxide, 2,5-dimethyl-2,5-di(t-butylperoxy)hexan-3-yne, diisopropylbenzene hydroperoxide, 1,1,3,3-tetramethylbutyl hydroperoxide, cumene hydroperoxide, t-butyl hydroperoxide, 2,4-dichlorobenzoyl peroxide, o-chlorobenzoyl peroxide, p-chlorobenzoyl peroxide, tris(t-butylperoxy)triazine, 2,4,4-trimethylpentyl peroxyneodecanoate, α-cumyl peroxyneodecanoate, t-amyl peroxy-2-ethylhexanoate, t-butyl peroxyisobutyrate, di-t-butyl peroxyhexahydroterephthalate, di-t-butyl peroxytrimethyladipate, di-3-methoxybutyl peroxydicarbonate, diisopropyl peroxydicarbonate, t-butyl peroxy isopropyl carbonate, 1,6-bis(t-butylperoxycarbonyloxy)hexane, diethylene glycol bis(t-butylperoxycarbonate), and t-hexyl peroxyneodecanoate; as well as Trigonox 36-C75, Laurox, Perkadox L-W75, Perkadox CH-50L, Trigonox TMBH, Kayacumene H, Kayabutyl H-70, Perkadox BC-FF, Kayahexa AD, Perkadox 14, Kayabutyl C, Kayabutyl D, Perkadox 12-XL25, Trigonox 22-N70 (22-70E), Trigonox D-T50, Trigonox 423-C70, Kayaester CND-C70, Trigonox 23-C70, Trigonox 257-C70, Kayaester P-70, Kayaester TMPO-70, Trigonox 121, Kayaester O, Kayaester HTP-65W, Kayaester AN, Trigonox 42, Trigonox F-C50, Kayabutyl B, Kayacarbon EH, Kayacarbon I-20, Kayacarbon BIC-75, Trigonox 117, and Kayaren 6-70, all available from Kayaku AKZO Corp.

The curing agent may be used alone or in a combination of two or more.

The amount of component (Bc) used is 0.1 to 10 parts by weight, preferably 1 to 5 parts by weight per 100 parts by weight of component (A1). With less than 0.1 part of component (Bc), cure may be insufficient. More than 10 parts of the initiator can produce excess outgassing, invite cure shrinkage, or cause the resin to have high hardness or elastic modulus beyond expectation.

Examples of the epoxy resin crosslinker (Be) is not particularly limited as long as it induces heat crosslinking reaction with the hydroxyl group in the divalent group derived from a hydroxyl-containing aromatic diamine in G', to form a cured product. Examples include bisphenol A epichlorohydrin type epoxy resins, diethylene glycol diglycidyl ether, ethylene diglycidyl ether, polyethylene glycol diglycidyl ether, propylene glycol diglycidyl ether, tripropylene glycol diglycidyl ether, 1,6-hexanediol diglycidyl ether, glycerol diglycidyl ether, glycerol triglycidyl ether, diglycidylaniline, trimethylolpropane triglycidyl ether, 1,3-bis(N,N-diglycidylaminoethyl)cyclohexane, N,N,N',N'-tetraglycidyl-m-xylenediamine, and commercial products available under trade name jER from Mitsubishi Chemical Co., Ltd., for example, which may be used alone or in a combination of two or more.

The amount of component (Be) used is 0.1 to 10 parts by weight, preferably 1 to 5 parts by weight per 100 parts by weight of component (A2). With less than 0.1 part of component (Be), cure may be insufficient. More than 10 parts of the crosslinker can produce excess outgassing, invite cure shrinkage, or cause the resin to have high hardness or elastic modulus beyond expectation.

(3) Component (C)

The solvent as component (C) is used for decreasing the viscosity of the composition in order to facilitate coating to substrates or the like and improve workability.

Exemplary solvents are organic solvents including ketone solvents such as acetone, methyl ethyl ketone, methyl isobutyl ketone, and cyclohexanone; ether solvents such as dioxane, dioxolane, tetrahydrofuran, 1,2-dimethoxyethane, bis(2-methoxyethyl) ether, 1,2-bis(2-methoxyethoxy)ethane, bis(2-(2-methoxyethoxy)ethyl)ether, and methyl tert-butyl ether; ester solvents such as butyl acetate, isobutyl acetate, amyl acetate, γ-valerolactone, and CELTOL series (from Daicel Corp.) including 3-methoxy butyl acetate (MBA), ethylene glycol monobutyl ether acetate (BMGAC), diethylene glycol monoethyl ether acetate (EDGAC), diethylene glycol monobutyl ether acetate (BDGAC), cyclohexanol acetate (CHXA), dipropylene glycoldimethyl ether (DMM), dipropylene glycol methyl-n-propyl ether (DPMNP), propylene glycol monomethyl ether acetate (PG-MEA), dipropylene glycol methyl ether acetate (DPMA), 1,4-butanediol diacetate (1,4-BDDA), 1,3-butylene glycolacetate (1,3-BGDA), and 1,6-hexanediol diacetate (1,6-HDDA); and amide solvents such as dimethylformamide, dimethylacetamide, N-methylpyrrolidone, N-methylcaprolactam, and 1,3-dimethyl-2-imidazolidinone, which may be used alone or in a combination of two or more.

The solvent (C) may be used in any desired amount as long as the dissolution of the silicone-modified polyimide resin (A1) or (A2) is not impaired. The amount of the solvent (C) is typically 100 to 700 parts by weight based on the silicone-modified polyimide resin (A1) or (A2).

(4) Component (D)

An antioxidant (D) may be added to the silicone-modified polyimide resin composition for the purpose of improving the heat resistance of a cured product thereof. The antioxidant used herein may be selected from well-known antioxidants such as phenol compound-based antioxidants, organic sulfur compound-based antioxidants, amine compound-based antioxidants, and phosphorus compound-based antioxidants.

Examples of the phenol compound-based antioxidant include 2,6-di-t-butyl-4-methylphenol, n-octadecyl-3-(3,5-di-t-butyl-4-hydroxyphenyl)propionate, 2,2'-methylene-bis (4-methyl-6-t-butylphenol), 3,9-bis[2-[3-(3-t-butyl-4-hydroxy-5-methylphenyl)propionyloxy]-1,1-dimethylethyl]-2,4,8,10-tetraoxaspiro[5.5]undecane, 4,4'-butylidenebis(6-t-butyl-3-methylphenol), 4,4'-thiobis(6-t-butyl-3-methylphenol), tetrakis[methylene-3-(3,5-di-t-butyl-4-hydroxyphenyl)propionate]methane, 2,2-thiodiethylene bis[3-(3,5-di-t-butyl-4-hydroxyphenyl)propionate], N,N'-hexamethylenebis[3-(3,5-di-t-butyl-4-hydroxyphenyl)propionamide], isooctyl-3-(3,5-di-t-butyl-4-hydroxyphenyl)propionate, 1,3,5-trimethyl-2,4,6-tris(3,5-di-t-butyl-4-hydroxybenzyl)benzene, 4,6-bis(dodecylthiomethyl)-o-cresol, calcium bis (ethyl 3,5-di-t-butyl-4-hydroxybenzylphosphonate), 2,4-bis [(octylthio)methyl]-o-cresol, 1,6-hexanediol-bis[3-(3,5-di-t-butyl-4-hydroxyphenyl)propionate], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 2,2'-methylenebis(4-ethyl-6-t-butylphenol), 2,6-di-t-butyl-4-ethylphenol, 1,1,3-tris(2-methyl-4-hydroxy-5-t-butylphenyl)butane, triethylene glycol bis(3-t-butyl-4-hydroxy-5-methylphenyl)propionate, tris(3,5-di-t-butyl-4-hydroxybenzyl)isocyanurate, diethyl {[3,5-bis(1,1-dimethylethyl)-4-hydroxyphenyl]methyl}phosphonate, and 2,5,7,8-tetramethyl-2-(4',8',12'-trimethyltridecyl)chroman-6-ol, and 2,4-bis(n-octylthio)-6-(4-hydroxy-3,5-di-t-butylanilino)-1,3,5-triazine.

As the phenol compound-based antioxidant, those compounds containing a phenolic hydroxyl group and at least one of phosphorus atom, sulfur atom, and amine in the molecule are also listed, though they are redundant in the following list.

Examples of the organic sulfur compound-based antioxidant include dilauryl-3,3'-thiodipropionate, dimyristyl-3,3'-thiodipropionate, distearyl-3,3'-thiodipropionate, pentaerythrityl tetrakis(3-laurylthiopropionate), ditridecyl-3,3'-thiodipropionate, 2-mercaptobenzimidazole, 4,4'-thiobis(6-t-butyl-3-methylphenol), 2,2-thiodiethylene bis[3-(3,5-di-t-butyl-4-hydroxyphenyl)propionate], 4,6-bis(dodecylthiomethyl)-o-cresol, 2,4-bis[(octylthio)methyl]-o-cresol, and 2,4-bis(n-octylthio)-6-(4-hydroxy-3,5-di-t-butylanilino)-1,3,5-triazine.

Examples of the amine compound-based antioxidant include N,N'-diallyl-p-phenylenediamine, N,N'-di-sec-butyl-p-phenylenediamine, octylated diphenylamine, and 2,4-bis(n-octylthio)-6-(4-hydroxy-3,5-di-t-butylanilino)-1,3,5-triazine.

Examples of the phosphorus compound-based antioxidant include tris(nonylphenyl) phosphite, triphenyl phosphite, calcium bis(ethyl 3,5-di-t-butyl-4-hydroxybenzylphosphonate), tris(2,4-di-t-butylphenyl)phosphite, and diethyl{[3,5-bis(1,1-dimethylethyl)-4-hydroxyphenyl] methyl}phosphonate.

Also, commercial antioxidants may be used. Examples thereof include ADK STAB AO-60, ADK STAB AO-50, ADK STAB AO-80, ADK STAB AO-330, ADK STAB LA-52, ADK STAB LA-57, ADK STAB LA-63P, ADK STAB LA-68, ADK STAB LA-72, ADK STAB LA-77Y, ADK STAB LA-77G, ADK STAB LA-81, ADK STAB LA-82, ADK STAB LA-87, ADK STAB LA-402AF, ADK STAB LA-502XP, and ADK STAB 2112, which are from Adeka Corp.; Irganox 1010, Irganox 1010FF, Irganox 1035, Irganox 1035FF, Irganox 1076, Irganox 1076FF, Irganox 1098, Irganox 1135, Irganox 1330, Irganox 1726, Irganox 1425WL, Irganox 1520L, Irganox 245, Irganox 245FF, Irganox 259, Irganox 3114, Irganox 5057, Irganox 565, and Irgafos 168, which are from BASF Japan; SUMILIZER GA-80, SUMILIZER MDP-S, SUMILIZER WX-R, SUMILIZER, WX-RC, and SUMILIZER TP-D, which are from Sumitomo Chemical Co., Ltd.; and Sumilizer BBM-S from Sumika Chemtex Co., Ltd.

The foregoing antioxidants may be used alone or in a combination of two or more.

When added, the amount of component (D) is 0.01 to 1 part by weight per 100 parts by weight of the silicone-modified polyimide resin (A1) or (A2). Less than 0.01 part of component (D) is insufficient to improve heat resistance whereas more than 1 part increases outgassing at high temperature.

The silicone-modified polyimide resin composition may be prepared by dissolving the silicone-modified polyimide resin (A1) or (A2) in the solvent (C) to form a silicone-modified polyimide resin solution, adding the heat decomposable radical initiator (Bc) or epoxy resin crosslinker (Be) thereto, and stirring the solution.

The silicone-modified polyimide resin composition should preferably have a viscosity at 25° C. of about 1 to about 300 mPa, as viewed from the use of a coater, typically bar coater, and also preferably has a nonvolatile content of up to 35% under conditions of 105° C. and 3 hours. Within these ranges, the composition is easy to handle and avoids uneven coating.

[2] Silicone Rubber

The silicone rubber used herein is not particularly limited. Examples include silicone rubber compounds such as millable silicone rubbers, cured products of liquid silicone rubber injection molding system (LIMS) materials, general purpose RTV rubbers, and moldmaking RTV rubbers, which are from Shin-Etsu Chemical Co., Ltd.

[3] Silicone Rubber/Silicone-Modified Polyimide Resin Laminate

The laminate may be obtained by applying the silicone-modified polyimide resin composition defined above on at least a part of a surface of the silicone rubber by means of a coater, typically bar coater and then curing the composition into a cured product layer.

Although the curing conditions for the silicone-modified polyimide resin composition are not particularly limited, the curing temperature is preferably 40 to 200° C., more preferably 50 to 150° C. and the curing time is preferably 1 to 300 minutes, more preferably 10 to 240 minutes.

The thickness of the cured product layer, though not particularly limited, is preferably 0.5 to 20 μm, more preferably 0.5 to 10 μm from considerations to ensure that the cured product layer conforms to the stretch of the silicone rubber and to decrease water vapor permeability.

Specifically, the cured product layer preferably has a water vapor permeability of up to 20 g/m$^2$-day as measured at film thickness 1.0 mm and 40° C., for preventing damages to electronic devices, for example, rust due to moisture.

The resulting surface-modified silicone rubber, i.e., silicone rubber/silicone-modified polyimide resin laminate of the invention is useful for electronic devices in the wearable field which require stretchability (i.e., stretchable electronic devices).

EXAMPLES

Synthesis Examples, Preparation Examples, Examples and Comparative Examples are given below for further illustrating the invention although the invention is not limited thereto.

In Examples, the molecular weight was measured versus polystyrene standards by a GPC instrument HLC-8320GPC (Tosoh Corp.) using tetrahydrofuran (THF) as mobile phase. For infrared absorption spectroscopy (IR) analysis, Nicolet 6700 (Thermo Fisher Scientific Inc.) was used. The glass transition temperature (Tg) was measured by DMS7100 (Hitachi High-Tech Science Corp.) and defined as a temperature corresponding to the maximum of tan δ. The viscosity at 25° C. was measured by a rotational viscometer.

In Examples, all parts are by weight.

The cured products of silicone-modified polyimide resin compositions were evaluated for adhesion, storage elastic modulus, and water vapor permeability by the following methods.

(1) Adhesion

The silicone-modified polyimide resin composition was applied onto a glass plate (Matsunami Glass Ind., Ltd.) and consecutively heat cured at 50° C. for 30 minutes, at 100° C. for 50 minutes, and at 150° C. for 120 minutes, yielding a cured film.

The cured film was evaluated for adhesion by the cross-cut peeling test (JIS K5400). The result is expressed as the number X of unpeeled sections per 100 cross-cut sections (X/100).

(2) Storage Elastic Modulus

The silicone-modified polyimide resin composition was applied onto an iron plate having a fluorochemical coating and consecutively heat cured at 50° C. for 30 minutes, at 100° C. for 60 minutes, and at 150° C. for 120 minutes, yielding a sheet of 0.3 mm thick. The sheet was measured for storage elastic modulus by DMS7100 (Hitachi High-Tech Science Corp.).

(3) Water Vapor Permeability

The silicone-modified polyimide resin composition was applied onto an iron plate having a fluorochemical coating and consecutively heat cured at 50° C. for 30 minutes, at 100° C. for 60 minutes, and at 150° C. for 120 minutes, yielding a sheet of 1 mm thick. The sheet was measured for water vapor permeability under the conditions (40° C.) of JIS K7129A by a water vapor permeation analyzer L80-5000 (Systech Instruments Ltd.).

[1] Synthesis of Silicone-Modified Polyimide Resin

Synthesis Example 1

A reactor equipped with a stirring impeller, thermometer, and nitrogen inlet tube was charged with 44.4 g (0.1 mole) of 2,2-bis(3,4-anhydrodicarboxyphenyl)hexafluoropropane, 12.3 g (0.03 mole) of 4,4'-(4,4'-isopropylidenediphenyl-1,1'-diyldioxy)dianiline (i.e., 2,2-bis[4-(4-aminophenoxy)phenyl]propane), 1.48 g (0.01 mole) of phthalic anhydride, and 336 g of cyclohexanone, which were stirred at 25° C. for 2 hours. Then 112.0 g (0.07 mole) of a diamino-modified silicone of formula (i) was added dropwise at 25° C. to the reactor. After the addition, stirring was continued at 25° C. for 12 hours. Then 37 g of toluene was added to the reactor, from which water was azeotroped off at 145° C. The reaction solution was added dropwise to methanol for reprecipitation, yielding a silicone-modified polyimide resin having a siloxane content of 66% by weight.

The resin had a weight average molecular weight (Mw) of 27,000 as measured by GPC. FIG. 1 shows the IR spectrum of the resin. As seen from FIG. 1, no absorption peaks assigned to unreacted polyamic acid were observed in the spectrum, but the absorption peaks assigned to an imide group were observed at 1,780 cm$^{-1}$ and 1,720 cm$^{-1}$.

[Chem. 11]

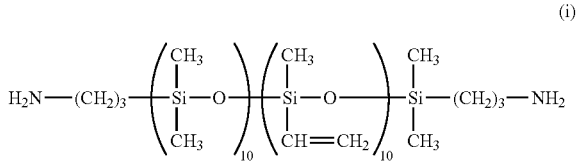

(i)

Herein the siloxane units in parentheses are randomly arranged.

Synthesis Example 2

A reactor equipped with a stirring impeller, thermometer, and nitrogen inlet tube was charged with 44.4 g (0.1 mole) of 2,2-bis(3,4-anhydrodicarboxyphenyl)hexafluoropropane, 12.3 g (0.03 mole) of 4,4'-(4,4'-isopropylidenediphenyl-1,1'-diyldioxy)dianiline [i.e., 2,2-bis[4-(4-aminophenoxy)phenyl]propane], 4.3 g (0.02 mole) of 3,3'-dihydroxybenzidine, 0.15 g (0.001 mole) of phthalic anhydride, and 229 g of cyclohexanone, which were stirred at 25° C. for 2 hours. Then 41.5 g (0.05 mole) of a diamino-modified silicone of formula (ii) was added dropwise at 25° C. to the reactor. After the addition, stirring was continued at 25° C. for 12 hours. Then 23 g of toluene was added to the reactor, from which water was azeotroped off at 145° C. The reaction solution was added dropwise to methanol for reprecipitation, yielding a silicone-modified polyimide resin having a siloxane content of 45% by weight.

Figure 2:
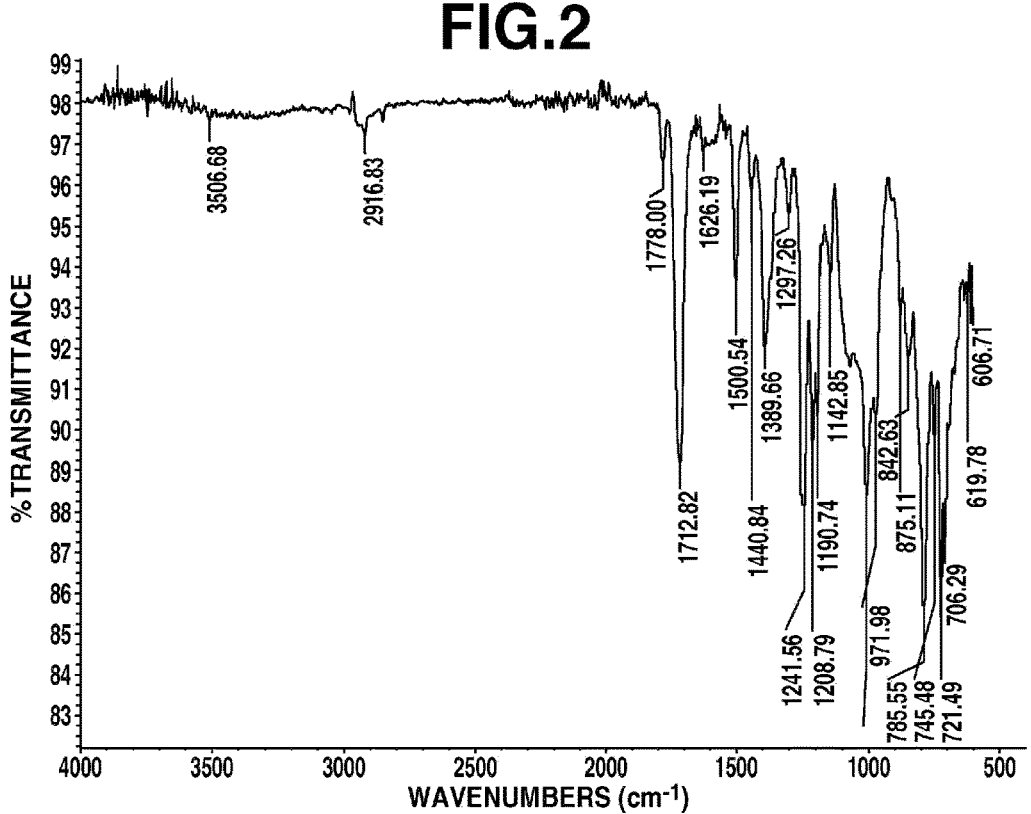
FIG. 2 is a diagram of the infrared absorption spectrum of the silicone-modified polyimide resin obtained in Synthesis Example 2.

The resin had a Mw of 24,500 as measured by GPC. FIG. 2 shows the IR spectrum of the resin. As seen from FIG. 2, no absorption peaks assigned to unreacted polyamic acid were observed in the spectrum, but the absorption peaks assigned to an imide group were observed at 1,780 cm$^{-1}$ and 1,720 cm$^{-1}$.

[Chem. 12]

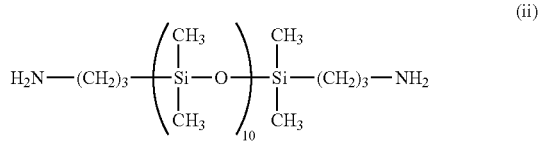

(ii)

Synthesis Example 3

A reactor equipped with a stirring impeller, thermometer, and nitrogen inlet tube was charged with 44.4 g (0.1 mole) of 2,2-bis(3,4-anhydrodicarboxyphenyl)hexafluoropropane, 12.3 g (0.03 mole) of 4,4'-(4,4'-isopropylidenediphenyl-1,1'-diyldioxy)dianiline, 1.48 g (0.01 mole) of phthalic anhydride, and 559 g of cyclohexanone, which were stirred at 25° C. for 2 hours. Then 221.2 g (0.07 mole) of a diamino-modified silicone of the following formula (iii) was added dropwise at 25° C. to the reactor. After the addition, stirring was continued at 25° C. for 12 hours. Then 56 g of toluene was added to the reactor, from which water was azeotroped off at 145° C. The reaction solution was added dropwise to methanol for reprecipitation, yielding a silicone-modified polyimide resin having a siloxane content of 79% by weight.

The resin had a Mw of 36,000 as measured by GPC. In the IR spectrum of the resin, no absorption peaks assigned to unreacted polyamic acid were observed, but the absorption peaks assigned to an imide group were observed at 1,780 $cm^{-1}$ and 1,720 $cm^{-1}$.

[Chem. 13]

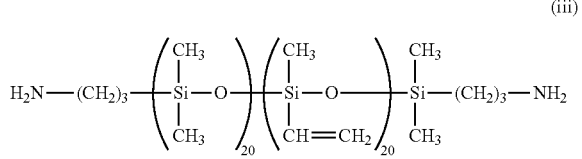

(iii)

Herein the siloxane units in parentheses are randomly arranged.

[2] Preparation of Silicone-Modified Polyimide Resin Composition and Cured Product Preparation Example 1

A solution was prepared by adding 236 parts of propylene glycol monomethyl ether acetate (PGMEA, hereinafter) to 100 parts of the silicone-modified polyimide resin obtained in Synthesis Example 1 and stirring until dissolution. ADK STAB LA-77Y (Adeka Corp.), 0.1 part, was added to the solution and stirred and then 1 part of Kayaren 6-70 (Kayaku AKZO Corp.) was added thereto. Subsequent mixing and stirring yielded a silicone-modified polyimide resin composition, which had a viscosity at 25° C. of 200 mPa·s.

A cured product of the composition showed an adhesion of 100/100 (cross-cut peeling test, film thickness 0.23 mm), a storage elastic modulus of 80 MPa, a Tg of 111° C., and a water vapor permeability of 16 $g/m^2$-day.

Preparation Example 2

A solution was prepared by adding 1,011 parts of PGMEA to 100 parts of the silicone-modified polyimide resin obtained in Synthesis Example 1 and stirring until dissolution. ADK STAB LA-77Y (Adeka Corp.), 0.1 part, was added to the solution and stirred and then 1 part of Kayaren 6-70 (Kayaku AKZO Corp.) was added thereto. Subsequent mixing and stirring yielded a silicone-modified polyimide resin composition, which had a viscosity at 25° C. of 50 mPa·s.

A cured product of the composition showed an adhesion of 100/100 (cross-cut peeling test, film thickness 0.08 mm), a storage elastic modulus of 80 MPa, a Tg of 111° C., and a water vapor permeability of 16 $g/m^2$-day.

Preparation Example 3

A solution was prepared by adding 236 parts of PGMEA to 100 parts of the silicone-modified polyimide resin obtained in Synthesis Example 2 and stirring until dissolution. ADK STAB LA-77Y (Adeka Corp.), 0.1 part, was added to the solution and stirred and then 5 part of jER 630LSD (Mitsubishi Chemical Corp.) was added thereto. Subsequent mixing and stirring yielded a silicone-modified polyimide resin composition, which had a viscosity at 25° C. of 220 mPa·s.

A cured product of the composition showed an adhesion of 100/100 (cross-cut peeling test, film thickness 0.23 mm), a storage elastic modulus of 265 MPa, a Tg of 163° C., and a water vapor permeability of 9 $g/m^2$-day.

Preparation Example 4

A solution was prepared by adding 236 parts of PGMEA to 100 parts of the silicone-modified polyimide resin obtained in Synthesis Example 2 and stirring until dissolution. ADK STAB LA-77Y (Adeka Corp.), 0.1 part, was added to the solution and stirred and then 5 part of jER 630LSD (Mitsubishi Chemical Corp.) was added thereto. Subsequent mixing and stirring yielded a silicone-modified polyimide resin composition, which had a viscosity at 25° C. of 63 mPa·s.

A cured product of the composition showed an adhesion of 100/100 (cross-cut peeling test, film thickness 0.08 mm), a storage elastic modulus of 265 MPa, a Tg of 163° C., and a water vapor permeability of 9 $g/m^2$-day.

Preparation Example 5

A silicone-modified polyimide resin composition was prepared as in Preparation Example 1 aside from using 100 parts of the silicone-modified polyimide resin in Synthesis Example 3 instead of 100 parts of the silicone-modified polyimide resin in Synthesis Example 1. The composition had a viscosity at 25° C. of 280 mPa·s.

A cured product of the composition showed an adhesion of 100/100 (cross-cut peeling test, film thickness 0.08 mm), a storage elastic modulus of 8 MPa, a Tg of 60° C., and a water vapor permeability of 50 $g/m^2$-day.

[3] Preparation of Silicone Rubber/Silicone-Modified Polyimide Resin Laminate

Examples 1 to 8 and Comparative Example 1

Each of the silicone-modified polyimide resin compositions in Synthesis Examples 1 to 5 was applied to the silicone rubber in Table 1 using a bar coater No. 4. The coating was consecutively heat cured at 50° C. for 30 minutes, at 100° C. for 1 hour, and at 150° C. for 2 hours to form a cured product layer, obtaining a silicone rubber/silicone-modified polyimide resin laminate.

The silicone-modified polyimide resin layer as cured had a thickness of 3 μm in Examples 1 and 3 and Comparative Example 1 and 1 μm in Examples 2 and 4.

The silicone rubbers in Table 1 are identified below.

KE-971-U: millable silicone rubber from Shin-Etsu Chemical Co., Ltd.

KE-571-U: millable silicone rubber from Shin-Etsu Chemical Co., Ltd.

KE-1950-20A/B: cured product of LIMS material from Shin-Etsu Chemical Co., Ltd.

KE-1875: general purpose RTV rubber from Shin-Etsu Chemical Co., Ltd.

KE-1315/CX-32-2359 (mixture of 100 parts/10 parts):
 moldmaking RTV rubber from Shin-Etsu Chemical Co., Ltd.

[Tensile Test]

The silicone rubber/silicone-modified polyimide resin laminates obtained in Examples 1 to 8 and Comparative Example 1 were inspected for rupture at a percent elongation of 100% by means of a tensile tester AGS-X (Shimadzu Corp.). The results are also shown in Table 1.

TABLE 1

| | Silicone rubber | Resin composition | Tensile test |
|---|---|---|---|
| Example 1 | KE-971-U | Preparation Example 1 | no rupture |
| Example 2 | KE-971-U | Preparation Example 2 | no rupture |
| Example 3 | KE-971-U | Preparation Example 3 | no rupture |
| Example 4 | KE-971-U | Preparation Example 4 | no rupture |
| Example 5 | KE-571-U | Preparation Example 2 | no rupture |
| Example 6 | KE-1950-20A/B | Preparation Example 2 | no rupture |
| Example 7 | KE-1875 | Preparation Example 2 | no rupture |
| Example 8 | KE-1315/CX-32-2359 (100/10) | Preparation Example 2 | no rupture |
| Comparative Example 1 | KE-971-U | Preparation Example 5 | ruptured at 80% |

As seen from Table 1, the resin laminates in Examples 1 to 8 are not ruptured in the tensile test, indicating that the cured product layers are fully conformable to the silicone rubber.

Comparative Example 2

The resin composition obtained in Preparation Example 1 was applied to silicone rubber KE-971-U using a bar coater No. 44. The coating was consecutively cured at 50° C. for 30 minutes, at 100° C. for 1 hour, and at 150° C. for 2 hours. There was obtained a silicone rubber/silicone-modified polyimide resin laminate having a silicone-modified polyimide resin layer of 30 μm thick.

The resin laminate underwent rupture at a percent elongation of 10% when tested by tensile tester AGS-X (Shimadzu Corp.).

[Measurement of Contact Angle with Water]

The silicone rubber/silicone-modified polyimide resin laminate obtained in Example 8 and silicone rubber KE-1315/CX-32-2359 (100/10) were measured for a contact angle with water by an automatic contact angle meter DM-501Hi (Kyowa Interface Science Co., Ltd.). The static contact angle with pure water was measured 5 times and averaged. The results are shown in Table 2.

TABLE 2

| | Example 8 | KE-1315/CX-32-2359 (100/10) |
|---|---|---|
| Average contact angle with water (°) | 101 | 114 |

[Evaluation of Adhesion to Silver Paste]

A template which had been made by cutting a pattern of 1 mm wide×40 mm long and another pattern of 2 mm wide×40 mm long out of a Teflon® sheet of 50 μm thick was laid on the cured product layer of each silicone rubber/silicone-modified polyimide resin laminate obtained in Examples 6, 8 and Comparative Example 1. Each of the silver pastes described below was applied through the patterns by means of a squeegee, and cured under the following conditions, completing a test piece.

For comparison sake, each silver paste was similarly applied and cured to silicone rubber KE-1950-20A/B having no silicone-modified polyimide resin layer, completing a test piece.

Silver Paste

SMP-2840: Shin-Etsu Chemical Co., Ltd.,
 curing conditions: 100° C. for 2 hours and 150° C. for 1 hour LOCTITE ABLESTIK ICP 4001:
 Henkel Ltd., curing conditions: 140° C. for 40 minutes When the above test pieces were extended to a percent elongation of 50%, they were inspected for peeling of the cured silver paste and rated according to the following criterion, with the proviso that cracking of the cured silver paste was not taken into account. The results are shown in Table 3.

◯: no peeling
Δ: partial peeling
X: complete peeling

TABLE 3

| | Resin laminate | Sliver paste | Peel test |
|---|---|---|---|
| Evaluation Example 1 | Example 6 | SW-2840 | ◯ |
| Evaluation Example 2 | Example 6 | LOCTITE | ◯ |
| Evaluation Example 3 | Example 8 | SW-2840 | ◯ |
| Evaluation Example 4 | Example 8 | LOCTITE | ◯ |
| Evaluation Example 5 | Comparative Example 1 | SW-2840 | Δ |
| Evaluation Example 6 | Comparative Example 1 | LOCTITE | Δ |
| Evaluation Example 7 | KE-1950-20A/B | SW-2840 | X |
| Evaluation Example 8 | KE-1950-20A/B | LOCTITE | X |

As seen from Table 3, the resin laminates in Examples 6 and 8 avoid peeling of the cured silver paste in the peel test, indicating satisfactory adhesion.

The invention claimed is:

1. A silicone rubber/silicone-modified polyimide resin laminate comprising a silicone rubber having a surface and a cured product layer of a silicone- modified polyimide resin composition disposed on at least a part of the silicone rubber surface, the cured product layer having a thickness of 0.5 to 20 μm, said silicone-modified polyimide resin composition comprising:

(A1) 100 parts by weight of a radically crosslinking silicone-modified polyimide resin having the following formula (1):

$$E_e\text{-}F_f\text{-}G_g \tag{1}$$

wherein E, F and G are repeating units which are randomly arranged, E is a divalent group derived from a diamino-modified silicone, represented by the formula (2), F is a divalent group derived from a tetracarboxylic dianhydride, represented by the formula (3), and G is a divalent group derived from a diamine, with the proviso that f+e+g=100 mol %, a molar ratio of f/(e+g) is from 0.9/1 to 1.1/1, and e is 1 to 90 when the sum of e+g is 100,

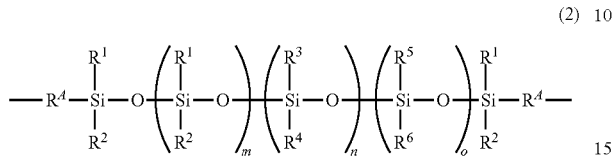
(2)

wherein $R^A$ is each independently a $C_1$-$C_{10}$ substituted or unsubstituted divalent hydrocarbon group, $R^1$ and $R^2$ are each independently a $C_1$-$C_{10}$ substituted or unsubstituted alkyl group, $R^3$ and $R^4$ are each independently a $C_1$-$C_{10}$ monovalent aliphatic hydrocarbon group, at least one of $R^3$ and $R^4$ has an aliphatic unsaturated bond, $R^5$ and $R^6$ are each independently a substituted or unsubstituted $C_1$-$C_{10}$ alkyl group, $C_6$-$C_{10}$ aryl group or $C_7$-$C_{16}$ aralkyl group, m is an integer of 0 to 20, n is an integer of 1 to 20, o is an integer of 0 to 20, the sum of m+n+o is 1 to 30, and the arrangement of siloxane units in parentheses with subscripts m, n, and o may be random, alternate or blockwise, -Im-X-Im-     (3)

wherein Im is a cyclic group terminated with a cyclic imide structure, and X is a single bond or a divalent group selected from among —O—, —S—, —S(→O)—, —S(=O)$_2$—, —C(=O)—, —NR$^N$— wherein $R^N$ is a $C_1$-$C_{12}$ monovalent hydrocarbon group, —CR$^B_2$— wherein $R^B$ is each independently hydrogen or a $C_1$-$C_{12}$ monovalent hydrocarbon group which may contain halogen, —R$^{Ar}_h$— wherein R$^{Ar}$ is a $C_6$-$C_{12}$ divalent arylene group, h is an integer of 1 to 6, and R$^{Ar}$ may be the same or different when h is at least 2, —R$^{Ar}_h$—(OR$^{Ar}$)$_i$— wherein R$^{Ar}$ and h are as defined above and i is an integer of 1 to 5, $C_1$-$C_{12}$ straight or branched alkylene groups, $C_5$-$C_{12}$ cycloalkylene groups, and $C_7$-$C_{12}$ arylenealkylene groups, (Bc) 0.1 to 10 parts by weight of a heat decomposable radical initiator, and (C) 100 to 700 parts by weight of a solvent, or (A2) 100 parts by weight of an epoxy curable silicone-modified polyimide resin having the following formula (1'):

E'e'-F'f'-G'g'     (1')

wherein E', F' and G' are repeating units which are randomly arranged, E' is a divalent group derived from a diamino-modified silicone, represented by the formula (2'), F' is a divalent group derived from a tetracarboxylic dianhydride, represented by the formula (3), G' is a divalent group derived from a diamine, and at least some of G' contain a divalent group derived from a hydroxyl-containing aromatic diamine, with the proviso that f'+e'+g'=100 mol %, a molar ratio of f'/(e'+g') is from 0.9/1 to 1.1/1, and e' is 1 to 90 when the sum of e'+g' is 100,

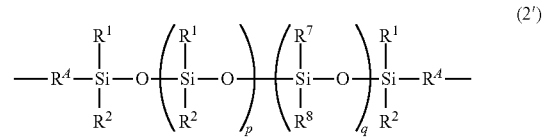
(2')

wherein $R^A$ is each independently a $C_1$-$C_{10}$ substituted or unsubstituted divalent hydrocarbon group, $R^1$ and $R^2$ are each independently a $C_1$-$C_{10}$ substituted or unsubstituted alkyl group, $R^7$ and $R^8$ are each independently a substituted or unsubstituted $C_6$-$C_{10}$ aryl group or $C_7$-$C_{16}$ aralkyl group, p is an integer of 1 to 20, q is an integer of 0 to 20, the sum of p+q is 1 to 30, and the arrangement of siloxane units in parentheses with subscripts p and q may be random, alternate or blockwise, -Im-X-Im-     (3)

wherein Im is a cyclic group terminated with a cyclic imide structure, and X is a single bond or a divalent group selected from among —O—, —S—, —S(→O)—, —S(=O)$_2$—, —C(=O)—, —NR$^N$— wherein $R^N$ is a $C_1$-$C_{12}$ monovalent hydrocarbon group, —CR$^B_2$— wherein $R^B$ is each independently hydrogen or a $C_1$-$C_{12}$ monovalent hydrocarbon group which may contain halogen, —R$^{Ar}_h$— wherein R$^{Ar}$ is a $C_6$-$C_{12}$ divalent arylene group, h is an integer of 1 to 6, and R$^{Ar}$ may be the same or different when h is at least 2, —R$^{Ar}_h$—(OR$^{Ar}$)$_i$— wherein R$^{Ar}$ and h are as defined above and i is an integer of 1 to 5, $C_1$-$C_{12}$ straight or branched alkylene groups, $C_5$-$C_{12}$ cycloalkylene groups, and $C_7$-$C_{12}$ arylenealkylene groups, (Be) 0.1 to 10 parts by weight of an epoxy resin cross-linker, and (C) 250 to 1,200 parts by weight of a solvent, wherein the cyclic group of Im is:

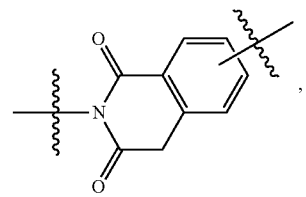

wherein each of the lines with an intersecting wavy line designates a valence bond, the valence bond of the nitrogen atom is attached to E or G in formula (1) or to E' or G' in formula (1'), and the other valence bond is attached to X.

2. The silicone rubber/silicone-modified polyimide resin laminate of claim 1 wherein said silicone-modified polyimide resin composition further comprises (D) 0.01 to 1 part by weight of an antioxidant per 100 parts by weight of component (A1) or (A2).

3. The silicone rubber/silicone-modified polyimide resin laminate of claim 1 wherein said silicone-modified polyimide resin composition has a viscosity at 25° C. of 1 to 300 mPa·s.

4. A stretchable electronic device comprising the silicone rubber/silicone-modified polyimide resin laminate of claim 1.

* * * * *